(12) United States Patent
Mahadik et al.

(10) Patent No.: US 10,985,994 B1
(45) Date of Patent: Apr. 20, 2021

(54) SIMULATED INCIDENT RESPONSE USING SIMULATED RESULT WHEN ACTUAL RESULT IS UNAVAILABLE

(71) Applicant: Splunk Inc., San Francisco, CA (US)

(72) Inventors: Atif Mahadik, Freemont, CA (US); Ryan Connor Means, San Jose, CA (US); Govind Salinas, Sunnyvale, CA (US); Sourabh Satish, Freemont, CA (US)

(73) Assignee: Splunk Inc., San Francisco, CA (US)

( * ) Notice: Subject to any disclaimer, the term of this patent is extended or adjusted under 35 U.S.C. 154(b) by 78 days.

(21) Appl. No.: 16/051,378

(22) Filed: Jul. 31, 2018

(51) Int. Cl.
*H04L 12/24* (2006.01)

(52) U.S. Cl.
CPC ........ *H04L 41/145* (2013.01); *H04L 41/0636* (2013.01); *H04L 41/0645* (2013.01); *H04L 41/0654* (2013.01); *H04L 41/22* (2013.01)

(58) Field of Classification Search
CPC .................................................... H04L 41/145
See application file for complete search history.

(56) References Cited

U.S. PATENT DOCUMENTS

| 8,752,030 | B1 * | 6/2014 | Chen .................. G06Q 10/0633 717/135 |
| 8,997,224 | B1 * | 3/2015 | Lu ...................... H04L 63/1441 726/22 |
| 2008/0263400 | A1 * | 10/2008 | Waters .................. G06F 11/261 714/30 |
| 2011/0016454 | A1 * | 1/2011 | Paintal ................ G06F 11/3664 717/127 |
| 2013/0091541 | A1 * | 4/2013 | Beskrovny .......... G06F 11/3688 726/1 |
| 2014/0222321 | A1 * | 8/2014 | Petty .................. G01C 21/3492 701/117 |
| 2015/0205606 | A1 * | 7/2015 | Lindholm ............... G06F 9/528 712/234 |
| 2016/0057025 | A1 * | 2/2016 | Hinrichs ............. H04L 41/5025 709/224 |

\* cited by examiner

*Primary Examiner* — Andrew C Georgandellis
(74) *Attorney, Agent, or Firm* — Nicholn De Vos Webster & Elliott LLP

(57) ABSTRACT

Described herein are improvements for generating courses of action for an information technology (IT) environment. In one example, a method includes identifying a first course of action for responding to an incident type in an information technology environment and generating a simulated incident associated with the incident type. The method further includes initiating performance of the first course of action based on the generation of the simulated incident. The method also includes, upon reaching a particular step of the first course of action that prevents the performance of the first course of action from proceeding, providing a first simulated result that allows the performance of the first course of action to proceed.

28 Claims, 9 Drawing Sheets

SIMULATED INCIDENT RESPONSE USING SIMULATED RESULT WHEN ACTUAL RESULT IS UNAVAILABLE

TECHNICAL BACKGROUND

An increasing number of threats exist in the modern computerized society. These threats may include viruses or other malware that attack a local computer of an end user, or sophisticated cyber-attacks to gather data from or otherwise infiltrate a complex information technology (IT) environment. Such IT environments include real and virtual computing devices executing various applications used to provide a variety of services, such as data routing and storage, cloud processing, web sites and services, amongst other possible services. To protect applications and services, various antivirus, encryption, and firewall tools may be used across an array of computing devices and operating systems, such as Linux® and Microsoft Windows®.

IT environments may employ a variety of computing components with different hardware and software configurations to provide the desired operation. These computing components may include end user computing devices, host computing devices, virtual machines, switches, routers, and the like. However, as more computing components are added to an IT environment, those same components become available as targets of potential security threats or incidents. The increasing number computing components in combination with limited administrative personnel and resources can make it difficult to manage the investigation and remediation of potential threats. Even with ample administrators or analyst users, it can be cumbersome to coordinate the investigation and remediation efforts.

OVERVIEW

Described herein are improvements for generating courses of action for an information technology (IT) environment. In one example, a method includes identifying a first course of action for responding to an incident type in an information technology environment and generating a simulated incident associated with the incident type. The method further includes initiating performance of the first course of action based on the generation of the simulated incident. The method also includes, upon reaching a particular step of the first course of action that prevents the performance of the first course of action from proceeding, providing a first simulated result that allows the performance of the first course of action to proceed.

DETAILED DESCRIPTION

For a particular information technology (IT) environment, one or more administrative users can be tasked with maintaining the devices, systems, and networks of the IT environment. Maintenance tasks may include handling any incidents that the IT environment encounters. Incidents that may constitute security threats may include malware (e.g., viruses, worms, ransomware, etc.), denial of service attacks, unauthorized access attempts, information fishing schemes, or some other type of computer or network related event that could adversely affect the IT environment or users of the IT environment. Other types of incidents, such as operational incidents (e.g., software issues, hardware issues, connectivity issues, etc.), that may occur within an IT environment may also be handled. Upon being notified of an incident, an administrative user uses tools provided by the IT environment to perform various actions for handling the incident. The tools may include functions that, depending on the type of incident, find the source of the incident (e.g., a source address or domain of a network attack), remove an offending process (e.g., deleting malware), isolate an affected asset of the IT environment in a VLAN, identify assets related to the affected asset, implementing a firewall rule (e.g., to block certain network traffic), or any other action for identifying whether an incident is a security threat and, if so, to neutralize the security threat.

The actions taken by a user when handling one type of incident may be different from those taken when handling a different type of incident. If the user has not handled a similar incident recently, the user may take longer than desired to perform actions necessary to handle the incident. Likewise, the user may unnecessarily perform actions that are ineffective at handling the incident because the user may not know any better. The examples herein assist the user in at least the aforementioned situations by allowing the user to define a course of action, or select an already defined course of action, and then test the performance of that course of action on a simulated incident. Testing helps ensure a course of action will be capable of handling an incident as intended before executing the course of action on an actual incident in an IT environment. A course of action may include one or more ordered or unordered actions that should be performed when handling an incident. If any of those actions cannot perform their intended function during testing, then the performance of the course of action may be prevented from proceeding. The examples herein provide a simulated result for an action in a course of action that cannot otherwise provide a result during testing, which allows performance of the course of action to proceed beyond that action.

Figure 1:
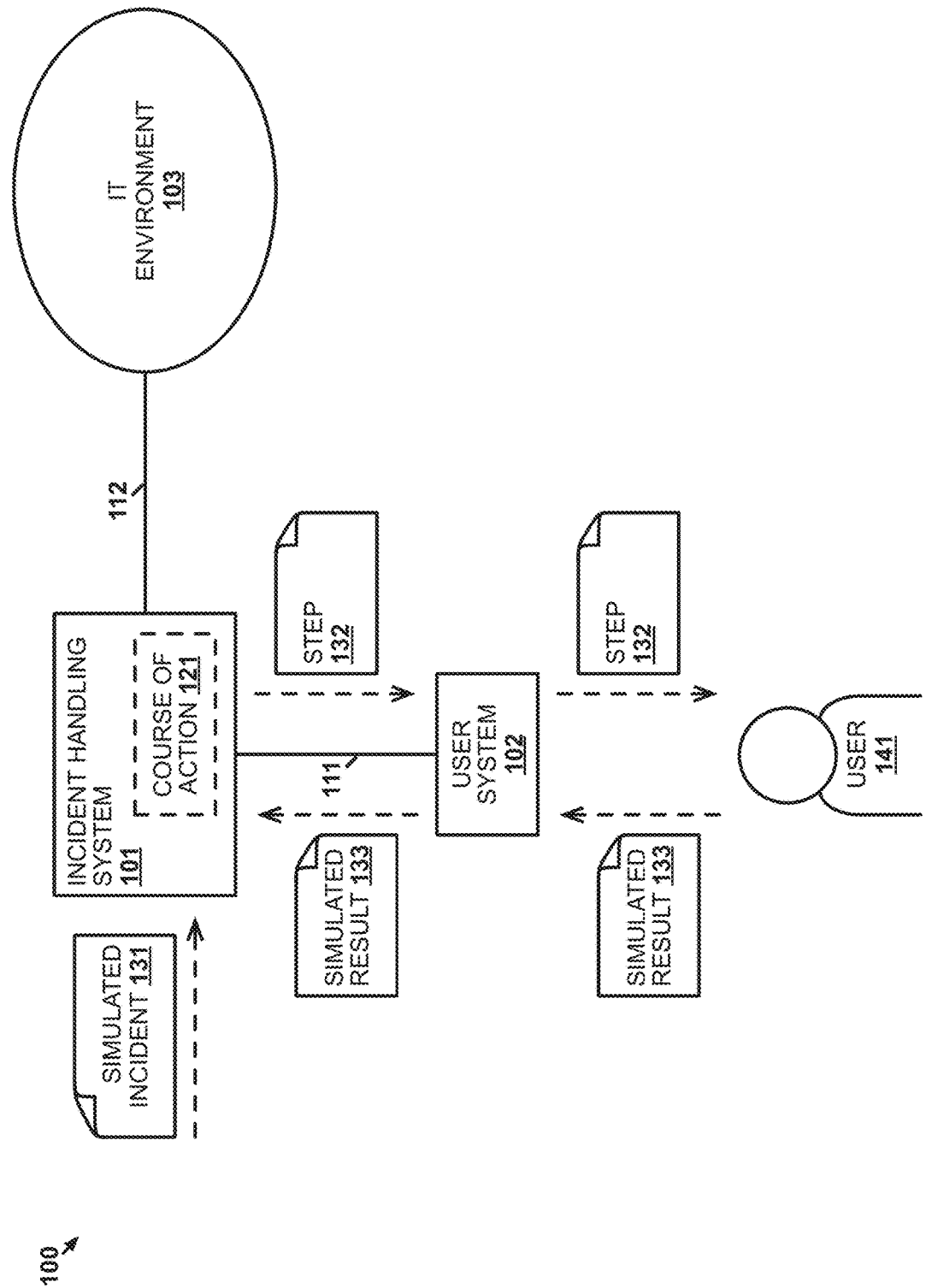
FIG. 1 illustrates an example network computing environment for simulating incident response using simulated results when actual results are unavailable.

FIG. 1 illustrates network computing environment 100 for simulating incident response using simulated results when actual results are unavailable. Network computing environment 100 includes incident handling system 101, user system 102, and IT environment 103. Incident handling system 101 and user system 102 communicate over communication link 111. Incident handling system 101 and IT environment 103 communicate over communication link 112. Communication link 111 and communication link 112 may be direct links or may include one or more intervening systems, networks, and/or devices. While shown outside of IT environment 103, incident handling system 101 and user system 102 may be considered part of IT environment 103.

In operation, user 141 is one of what may be multiple users tasked with handling incidents that may be security threats to IT environment 103 (although it should be understood that other types of incidents, such as operational incidents, may also be handled in accordance with the description below). User 141 operates user system 102, which may be a personal workstation or other computing device of user 141, to receive information about incidents that occur in IT environment 103 and to instruct incident handling system 101 to handle those incidents by performing various actions. In some examples, user 141 may operate incident handling system 101 directly through a user interface thereof rather than using a separate system, such as user system 102. Likewise, in some examples, the tasks performed by user system 102 and incident handling system 101 may be distributed differently between user system 102 and incident handling system 101. In those examples, the combination of incident handling system 101 and user system 102 as a whole may be considered an incident handling system.

Figure 2:
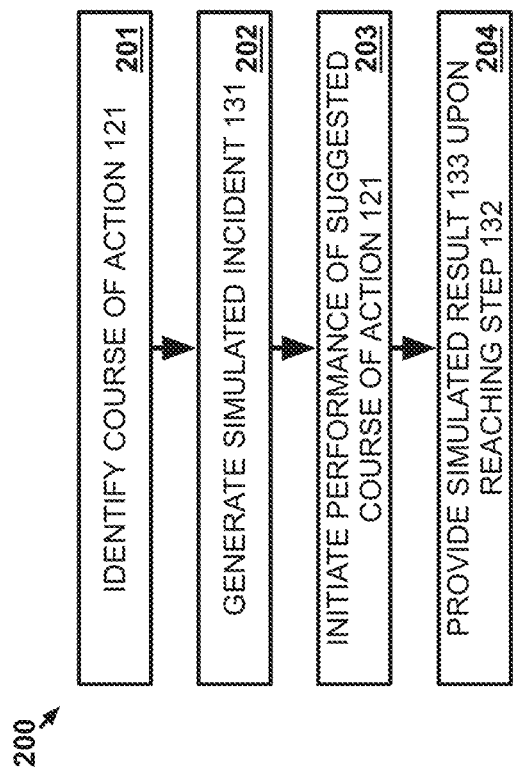
FIG. 2 illustrates an example operation for simulating incident response using simulated results when actual results are unavailable.

FIG. 2 illustrates a flowchart 200 of operating in network computing environment 100 for simulating incident response using simulated results when actual results are unavailable. Operation 200 describes an example for testing course of action 121 using simulated incident 131. Course of action 121 may have been created by user 141, by another user, by incident handling system 101 automatically, or by some other entity. Course of action 121 comprises steps that define actions that should be performed on an incident by incident handling system 101 (e.g., actions that determine information about the incident, remedial actions to account for issues caused by the incident, actions to prevent future similar incidents from happening, etc.). Course of action 121 is designed to respond to a particular type of incident (e.g., network packet attack, malware, phishing, etc. or some sub-category thereof). User 141 may, therefore, want to test course of action 121 on using an incident of the type for which course of action 121 was designed to ensure course of action 121 is capable of working as desired.

In operation 200, incident handling system 101 identifies course of action 121 (201). Incident handling system 101 may identify course of action 121 by receiving user input identifying course of action 121, by automatically selecting course of action 121 from among courses of action to be tested, by receiving course of action 121 from user system 102, or in some other manner. Incident handling system 101 generates simulated incident 131 associated with the incident type of which course of action 121 is meant to handle (202). Simulated incident 131 may be at least partially user defined by user 141 or may be automatically defined by incident handling system 101 based on the incident type for which course of action 121 is meant to handle. Simulated incident 131 may be defined using characteristics that would be used to describe an incident that actually occurs in IT environment 103, such as network addresses involved in the incident, protocols used in the incident, systems/devices of IT environment 103 involved in the incident, access privileges used in the incident, or some other information that would be beneficial for providing a description of an incident to varying levels of accuracy—including combinations thereof. Simulated incident 131 is defined in the same manner in which an actual incident in IT environment 103 would be described to incident handling system 101 since course of action 121 may be used to operate on actual incidents in IT environment 103. In some cases, simulated incident 131 may be a copy of an actual incident that occurred in IT environment 103.

Once simulated incident 131 is generated, incident handling system 101 initiates performance of course of action 121 (203). Upon initiation, incident handling system 101 performs the action defined by a particular step in course of action 121 before moving to the next step in sequence. Some steps may be performed in parallel, as may be defined by course of action 121. Upon reaching step 132 of course of action 121 that prevents the performance of course of action 121 from proceeding, incident handling system 101 provides simulated result 133 that allows the performance of course of action 121 to proceed (204). Step 132 may prevent the course of action from proceeding because the action of step 132 relies on a service external to incident handling system 101 that is not available when testing simulated incident 131, because a system necessary to perform the action of step 132 is offline, because additional information is needed to perform the action of step 132, because performing the action of step 132 on a simulated incident may have adverse effects on IT environment 103 (e.g., implementing a firewall rule in IT environment 103 based on a non-real incident), or for any other reason a result cannot be obtained from step 132. Simulated result 133 comprises a result that may be produced by step 132 had step 132 been able to produce a result (e.g., has the same format, does not have an impossible value, etc.). As such, the result can be used as needed during performance of course of action 121 (e.g., used as input for a subsequent step) in the same manner an actual result would have been.

In some examples, incident handling system 101 may automatically generate simulated result 133 based on what a subsequent step in course of action 121 requires as input. For example, if a subsequent step to step 132 requires a value within a range of values, incident handling system 101 may generate a value in that range and provide the value as simulated result 133 to the subsequent step since simulated result 133 was incapable of producing a proper value. In other examples, incident handling system 101 may notify user 141 of step 132 via user system 102, as shown in FIG. 1. If incident handling system 101 does not automatically determine simulated result 133, then user 141 may provide input through user system 102 that defines what the user desires simulated result 133 to be. Incident handling system 101 then uses simulated result 133 to proceed with course of action 121's performance on simulated incident 131.

In some examples, multiple paths may be taken after step 132 depending on the result from step 132. Simulated result 133 may therefore comprise a result that causes course of action 121 to proceed down one of those multiple paths. In some cases, incident handling system 101's performance of course of action 121 may provide additional simulated result 133's that cause performance course of action 121 to proceed down multiple paths either in parallel or after completing each respective path. This allows for testing more than one path of performance through course of action 121. It also should be understood that course of action 121 may include multiple steps that do not produce results and simulated result may be provided for those steps as well in the same manner described above.

Figure 3:
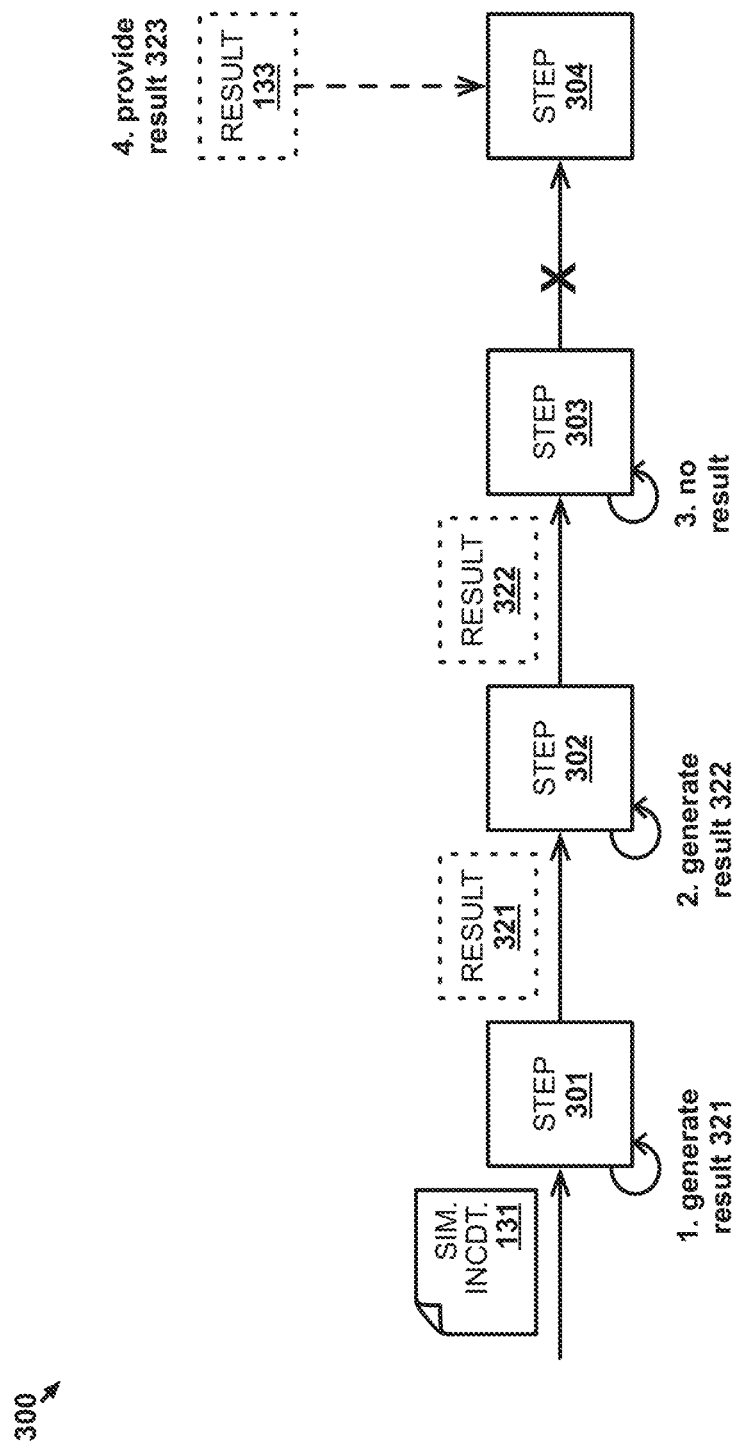
FIG. 3 illustrates another example operation for simulating incident response using simulated results when actual results are unavailable.

FIG. 3 illustrates operation 300 for simulating incident response using simulated results when actual results are unavailable. Operation 300 is an example of how simulated incident 131 may proceed through step 301, step 302, step 303, and step 304 of course of action 121. Course of action 121 in this example includes only four steps in series, though other examples may include more or fewer steps and may be arranged differently (e.g., have parallel steps, multiple paths, etc.). In operation 300, simulated incident 131 is processed by step 301, which generates result 321 at step 1. Likewise, result 321 is provided to step 302, which generates result 322 at step 2 of operation 300. While result 322 is able to be provided to step 303, step 303 (like step 132 above) cannot produce a result at step 3 of operation 300. Without a result from step 303, the performance of course of action 121 cannot proceed to step 304. Accordingly, so that the performance of course of action 121 can proceed to step 304, incident handling system 101 provides simulated result 133 to step 304 in place of an actual result from step 303.

Advantageously, course of action 121 can be tested to completion by incident handling system 101 even though step 303 is unable to produce a result. Without incident handling system 101's provision of simulated result 133 performance of course of action 121 would not make it to step 304 and step 304's ability to handle the processing of simulated incident 131 would remain unknown.

Figure 4:
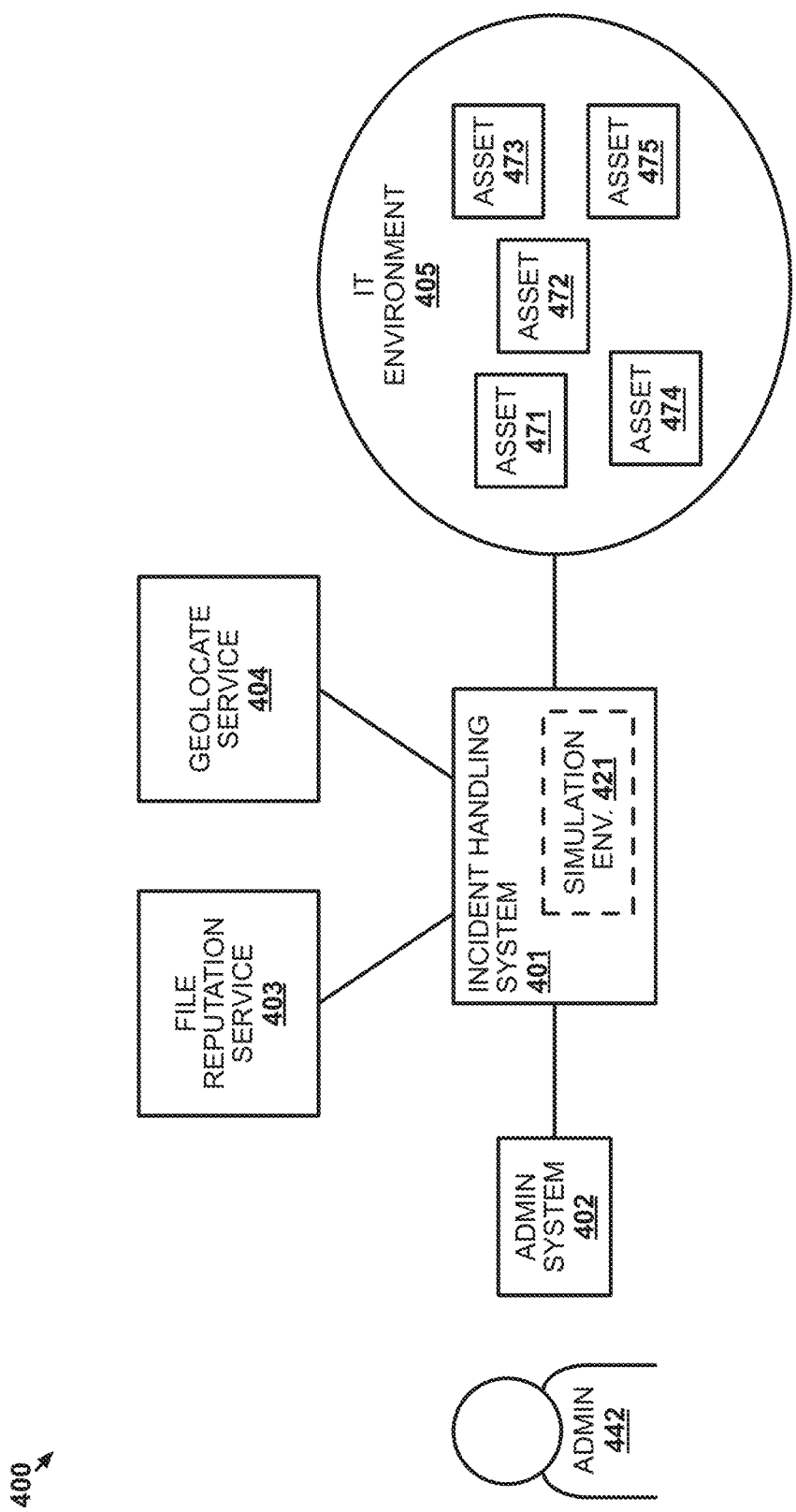
FIG. 4 illustrates another example network computing environment for simulating incident response using simulated results when actual results are unavailable.

FIG. 4 illustrates network computing environment 400 for simulating incident response using simulated results when actual results are unavailable. Network computing environment 400 includes incident handling system 401, administrative user system 402, file reputation service 403, geolocate service 404, and IT environment 405. Asset 371, asset 372, asset 373, asset 374, and asset 375 may comprise any combination of physical computing systems (e.g. personal computing systems, host computing systems, servers, and the like), virtual computing systems (e.g. virtual machines or containers), routers, switches, or some other similar computing component.

In operation, administrator 442 is a user tasked with maintaining the security of IT environment 405. Administrator 442 operates administrative user system 402 to perform their duties with respect to the security of IT environment 405. Administrative user system 402 communicates with incident handling system 401 to handle incidents that occur within IT environment 305 and simulate the handling of incidents, as discussed below.

Figure 5:
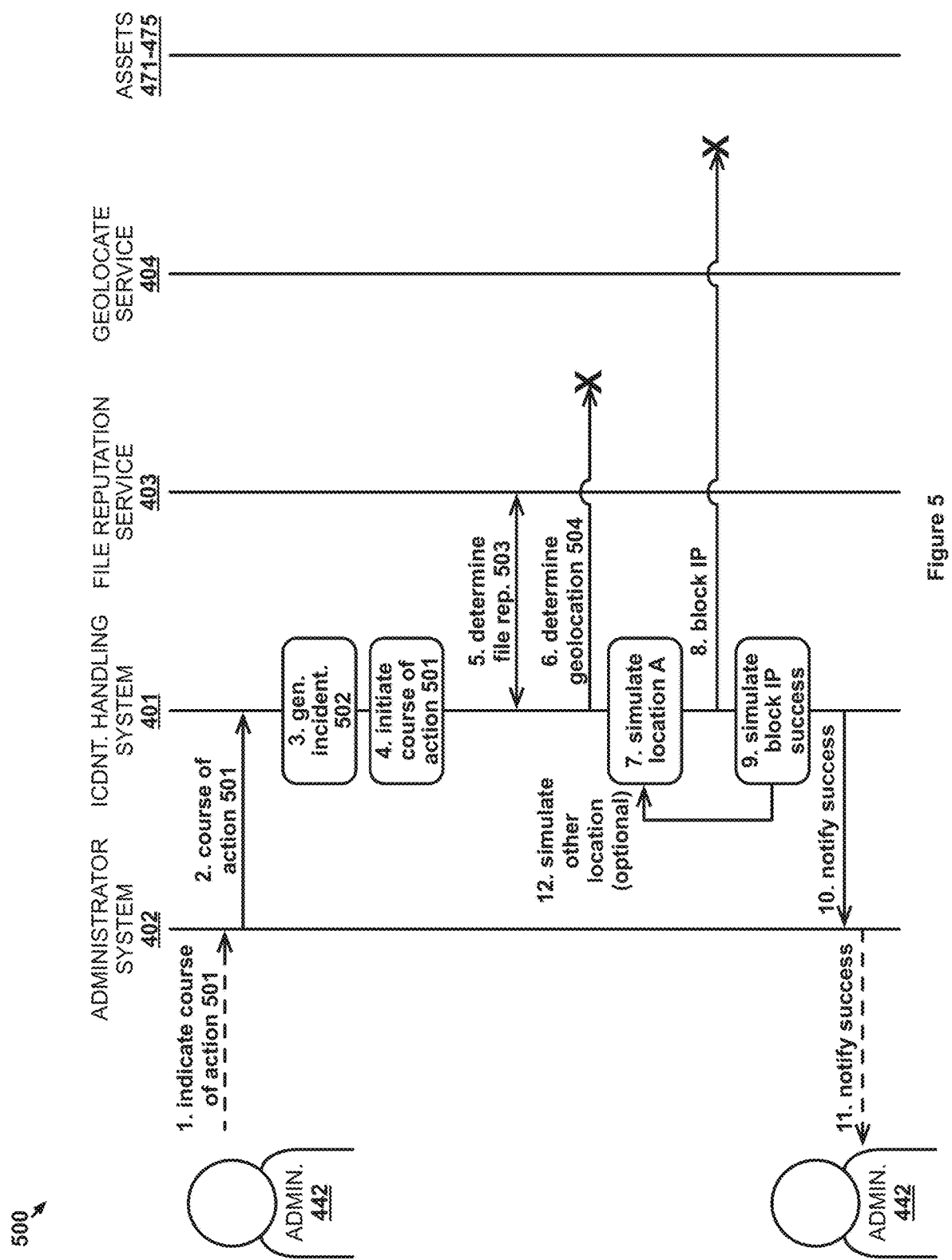
FIG. 5 illustrates an example operation for simulating incident response using simulated results when actual results are unavailable.

FIG. 5 illustrates operation 500 for simulating incident response using simulated results when actual results are unavailable. Operation 500 will be described in conjunction with the user interfaces illustrated in FIGS. 6-8. In operation 500, administrator 442 provides input to administrative user system 402 at step 1 indicating that administrator 442 desires that course of action 501 be tested in simulation environment 421 provided by incident handling system 401. In this example, simulation environment 421 allows incident handling system 401 to perform courses of action on simulated incidents without effecting IT environment 405. In other examples, simulations may occur in a different system than that which handles actual incidents in IT environment 405. Administrator 442 may have created course of action 501 before indicating that course of action 501 should be tested or may have selected course of action 501 after course of action 501 had already been created (e.g., from a list of courses of action). Administrative user system 402 then notifies incident handling system 401 at step 2 that course of action 501 is to be tested. The notification may include sending course of action 501 to incident handling system 401 or, if incident handling system 401 already stores course of action 501, may simply identify course of action 501 to incident handling system 401.

Figure 6:
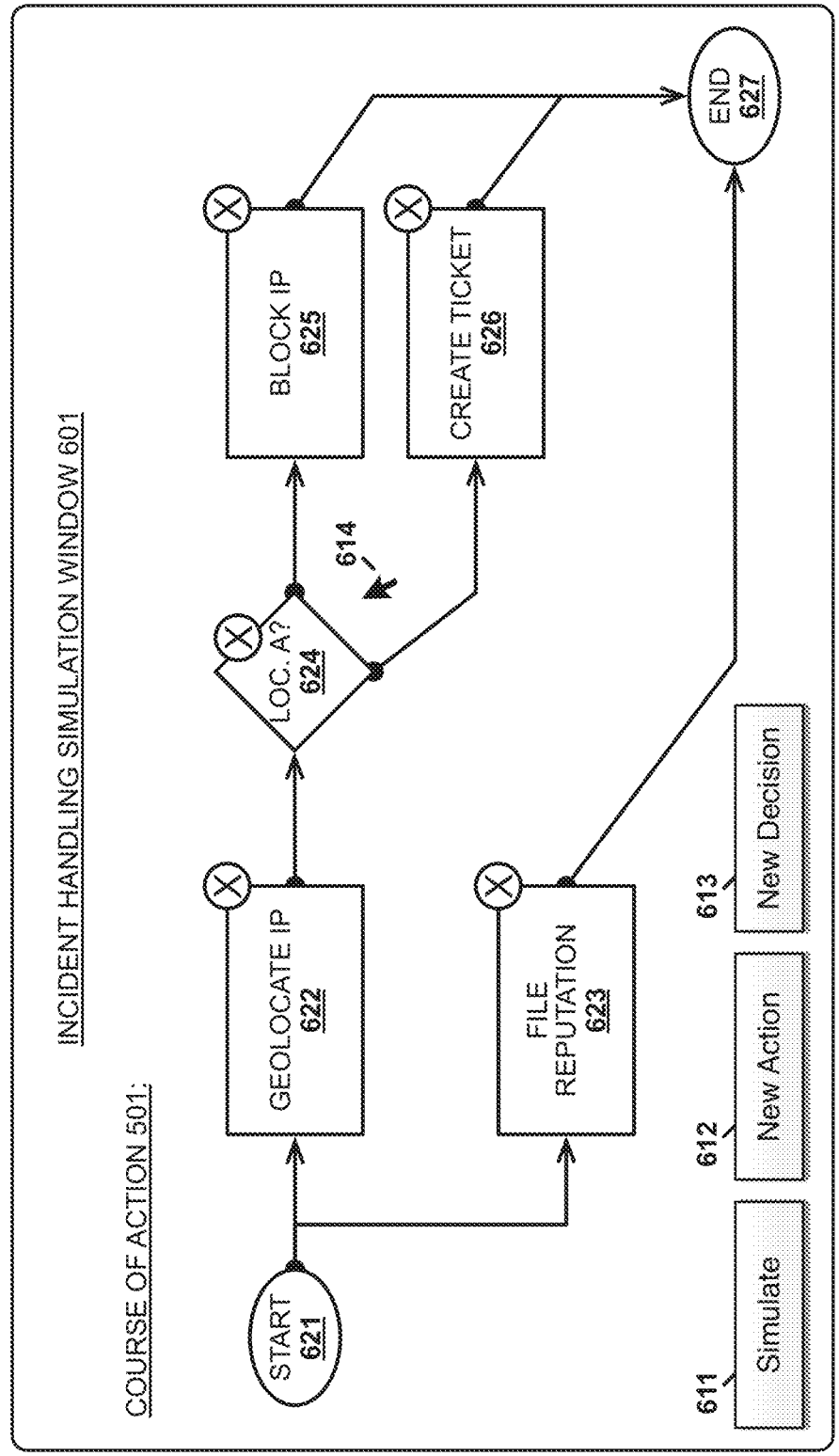
FIG. 6 illustrates a user interface for simulating incident response using simulated results when actual results are unavailable.

FIG. 6 illustrates user interface 600 for simulating incident response using simulated results when actual results are unavailable. User interface 600 is an example of administrative user system 402 may display course of action 501 to administrator 442. Course of action 501 is represented as a block flow diagram in incident handling simulation window 601 of user interface 600. Course of action 501 includes start point 621, end point 627, and decision point 624, and four action blocks, which include geolocate IP action 622, file reputation action 623, block IP action 625, and create ticket action 626 visually represented by blocks therein. The block diagram representing course of action 501 may comprise a visual programming language for courses of action, which allows for graphical manipulation (e.g., by manipulating the blocks in this example) of the course of action. The visual programming language is essentially a high-level representation of underlying instructions for incident handling system 401 to perform the defined actions. Of course, the actions described in course of action 501 may be different for other incidents.

In addition to a visual representation of course of action 501, user interface 600 further includes user interface elements simulate button 611, new action button 612, and new decision point button 613. When selected by administrator 442, simulate button 611 causes incident handling system 401 to perform the actions specified in accordance with course of action 501 in operation 500. When selected by administrator 442, new action button 612 adds a new action to course of action 501. When selected by administrator 442, new decision point button 613 adds a new decision point to course of action 501. Cursor 614 may be used to move blocks around on user interface 600, indicate to which blocks connectors should attach, select "X" elements on blocks to delete the blocks, or perform some other type of user interface manipulation. It should be understood that other forms of interacting with user interface 600 may also or instead be used, such as via touch input to a touchscreen.

Referring back to operation 500, incident handling system 401 generates simulated incident 502 at step 2. Simulated incident 502 is an incident of the type course of action 501 is meant to handle. For example, if course of action 501 is designed to respond to a malicious attack on IT environment 405 from an outside IP address, then simulated incident 502 will have characteristics of just such an attack. Once simulated incident 502 has been created, incident handling system 401 can perform course of action 501 at step 4 to simulate a response to simulated incident 502 beginning with start point 621.

From start point 621, course of action 501 directs to geolocate IP action 622 and file reputation action 623, which can be performed in parallel despite being described sequentially in operation 500. At step 5 of operation 500, incident handling system 401 interacts with file reputation service 403 to determine a file reputation 503 of a file attempting to be accessed by the attack of simulated incident 502. In this example, file reputation service 403 is able to provide file reputation 503, so the simulation of course of action 501 along the path that includes file reputation action 623 can proceed to end point 627. However, when incident handling system 401 attempts to perform geolocate IP action 622 at step 6 to determine geographic location 504 from which the attack of simulated incident 502 originated, incident handling system 401 determines that geolocate service 404 is unavailable. Geolocate service 404 may be unavailable because geolocate service 404 is down, a network connection with geolocate service 404 may be broken, incident handling system 401 may not yet be subscribed to geolocate service 404, or for some other reason a service may be unavailable.

In response to determining that geolocate service 404 is unavailable, incident handling system 401 simulates a location that geolocate service 404 may have provided had geolocate service 404 been available to incident handling system 401. For this example, incident handling system 401 provides "location A" as geographic location 504. A simulated location needs to be provided by incident handling system 401 because, otherwise, course of action 501 would not be able to proceed to decision point 624 where the location determined by geolocate IP action 622 is processed to determine whether block IP action 625 or create ticket action 626 should be performed next. Incident handling system 401 may automatically recognize, based on decision point 624, that the result of geolocate IP action 622 needs to be location A to direct towards block IP action 625. Alternatively, administrator 442 may provide input indicating that location A should be simulated, as described in FIG. 7.

Figure 7:
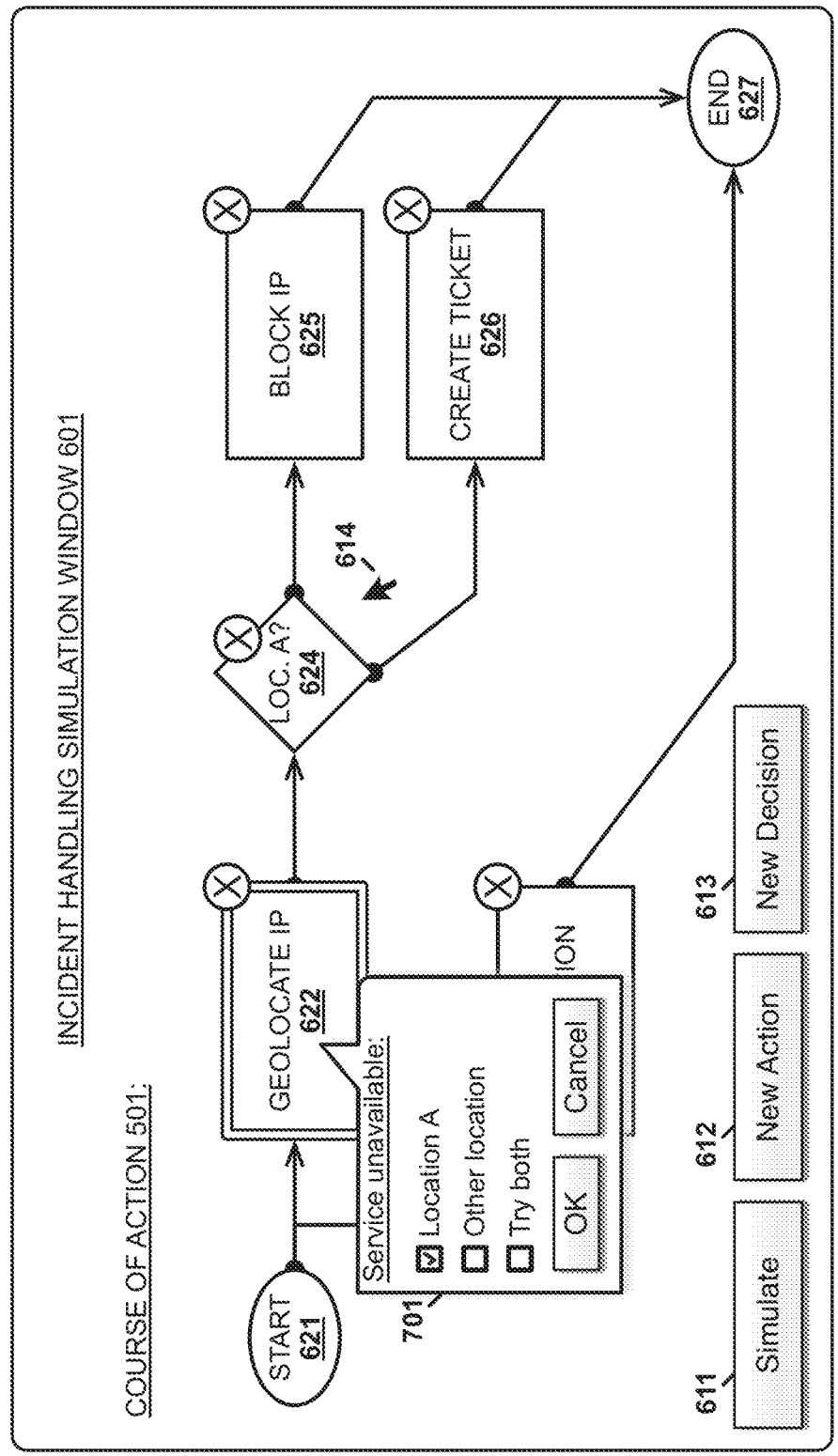
FIG. 7 illustrates another user interface for simulating incident response using simulated results when actual results are unavailable.

FIG. 7 illustrates user interface 700 for simulating incident response using simulated results when actual results are unavailable. In this example, user interface 700 corresponds to user interface 600 once incident handling system 401 determined at step 6 of operation 500 that geolocate service 404 is unavailable. User interface 800 highlights geolocate IP action 622 to indicate that geolocate IP action 622 could not produce a result. Other manners of visually indicating that geolocate IP action 622 could not produce a result may also be used. In some examples, user interface 800 may also provide a reason for why geolocate IP action 622 could not produce a result.

Additionally, popup interface element 701 is displayed in association with geolocate IP action 622. In this example, popup interface element 701 is positioned nearby the block for geolocate IP action 622 such that administrator 442 can visually associate popup interface element 701 with the block for the block for geolocate IP action 622. Popup interface element 701 allows administrator 442 to select which result administrator 442 would like incident handling system 401 to simulate. Popup interface element 701 may be displayed automatically upon incident handling system 401 determining that geolocate IP action 622 cannot produce a result. Alternatively, popup interface element 701 may be displayed in response to administrator 442 indicating that popup interface element 701 should be displayed. For example, administrator 442 may use cursor 614 to select geolocate IP action 622 when administrator 442 notices that geolocate IP action 622 has been highlighted, which results in the display of popup interface element 701. In some examples, user interface 700 may highlight each step as the step is being performed. In those examples, upon determining that geolocate IP action 622 cannot be performed, the highlight color may change (e.g., from green to red). Regardless of how user interface 700 indicates course of action 501 is stuck at geolocate IP action 622, in this example, administrator 442 selects that location A should be simulated as the result of geolocate IP action 622.

Referring back to operation 500, simulating location A causes decision point 624 to direct to block IP action 625. Incident handling system 401 therefore attempts to perform block IP action 625 at step 8. To perform block IP action 625, incident handling system 401 would need to instruct assets 471-475 to not allow (i.e., block) traffic coming from, or possibly going to, the IP address of simulated incident 502. However, since simulated incident 502 is not a real incident, it may not be wise to block an IP address for a non-real incident. Therefore, simulation environment 421 prevents incident handling system 401 from performing block IP action 625, which prevents block IP action 625 from being able to indicate a result (e.g., successful or not successful).

Upon incident handling system 401 recognizing that block IP action 625 cannot produce a result, incident handling system 401 simulates that block IP action 625 was performed successfully at step 9. Simulating that block IP action 625 was successful allows course of action 501 to proceed to end point 627. Upon reaching end point 627, both paths from start point 621 of course of action 501 have been completed and incident handling system 401 can notify administrative user system 402 at step 10 that the simulation of course of action 501 was successful. Administrative user system 402 then likewise notifies administrator 442 that the handling of simulated incident 502 by course of action 501 was successful. Of course, other results may be possible, including failures that administrator 442 will be informed about so they can act accordingly (e.g., by editing course of action 501). The testing of operation 500 reduces or eliminates the possibility that such a failure to complete course of action 501 was not caused to an unavailable step for which a result can be simulated.

Figure 8:
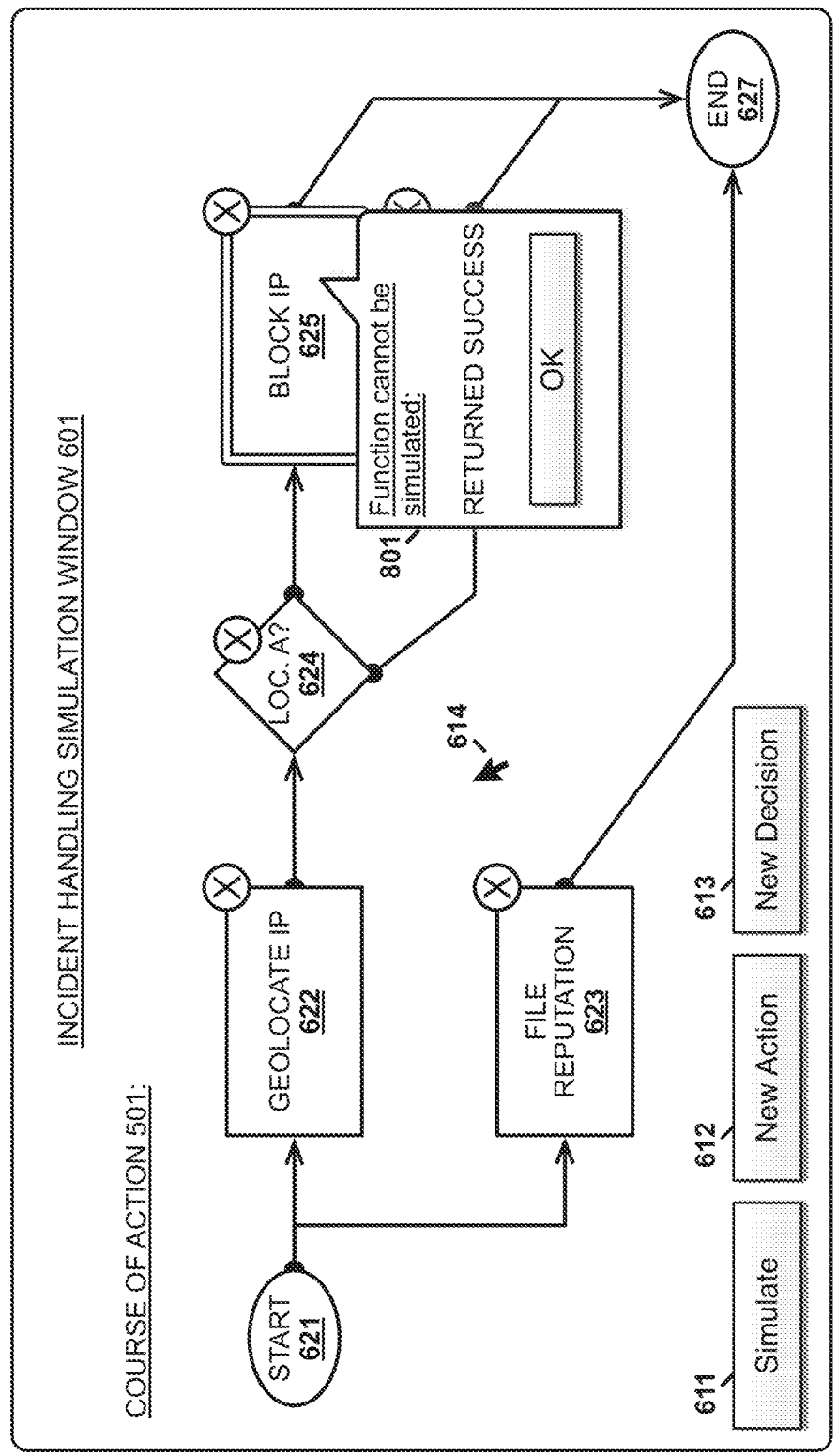
FIG. 8 illustrates yet another user interface for simulating incident response using simulated results when actual results are unavailable.

FIG. 8 illustrates user interface 800 for simulating incident response using simulated results when actual results are unavailable. In this example, user interface 800 corresponds to user interface 600 once incident handling system 401 determined at step 8 of operation 500 that block IP action 625 cannot produce a result. As was the case in user interface 700, user interface 800 highlights where performance of course of action 501 gets held up due to not being able to produce a result. Block IP action 625 is therefore highlighted in this case. Popup interface element 801 further indicates to user administrator 442 that block IP action 625 cannot be simulated. Unlike popup interface element 701, since there are not multiple possibilities for a result of block IP action 625 (i.e., an unsuccessful result would likely cause an error), popup interface element 801 simply indicates that the successful result was simulated rather than providing administrator 442 with the option to select a result.

Referring again back to operation 500, incident handling system 401 at step 12 may return to step 7 where location A was simulated and attempt to simulate a location other than location A. Step 12 may be performed in response to administrator 442 indicating that both options in popup interface element 701 should be tried in user interface 700. Simulating a location other than location A allows performance of course of action 501 to proceed to create ticket action 626 rather than block IP action 625, as described above. Create ticket action 626 can then be tested by incident handling system 401 to ensure that aspect of course of action 501 functions properly. In some examples, incident handling system 401 may simulate location A and another location in parallel rather than having to perform the two different simulation options sequentially. Upon completion of testing for course of action 501, administrator 442 will have a better understanding of whether course of action 501 can handle incidents of simulated incident 502's type.

Figure 9:
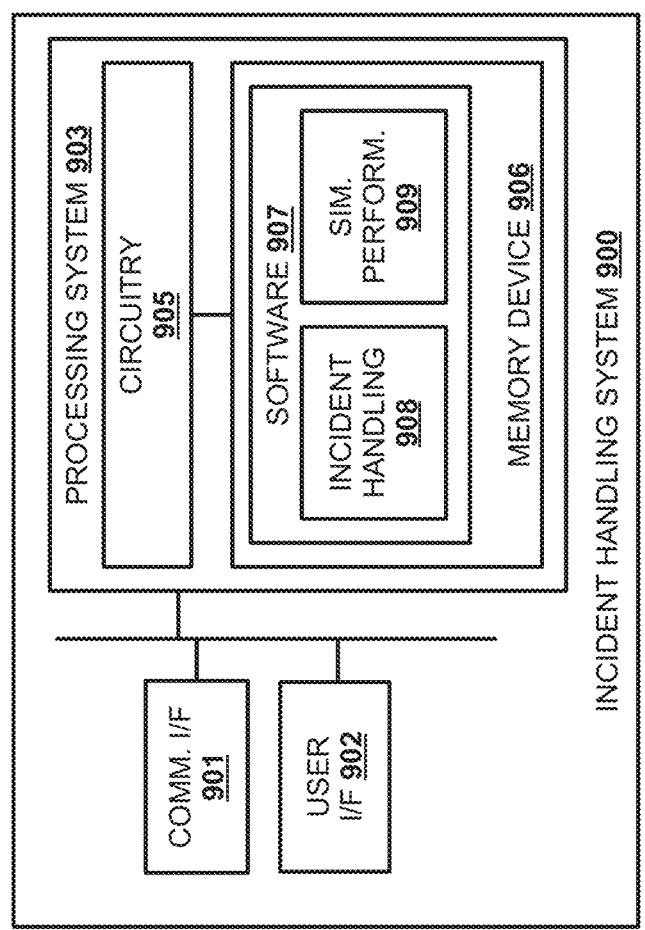
FIG. 9 illustrates a computing architecture for simulating incident response using simulated results when actual results are unavailable.

FIG. 9 illustrates incident handling system 900 for simulating incident response using simulated results when actual results are unavailable. Incident handling system 900 is an example computing architecture for incident handling system 101 and incident handling system 401, although alternative configurations may also be used. Incident handling system 900 may similarly be an example architecture for other elements described above, such as user system 102 and administrative user system 402, although alternative configurations may also be used. Incident handling system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises processing circuitry, such as a microprocessor, and other circuitry that retrieves and executes operating software 907 from memory device 906. Memory device 906 comprises one or more computer readable storage media, such as a disk drive, flash drive, data storage circuitry, or some other memory apparatus that in no cases should be considered a mere propagated signal. Operating software 907 comprises computer programs, firmware, or some other form of machine-readable processing instructions. Operating software 907 includes incident handling module 908 and simulation performance module 909. Operating software 907 may further include an operating system, utilities, drivers, network interfaces, applications, or some other type of software. When executed by circuitry 905, operating software 907 directs processing system 903 to operate incident handling system 900 as described herein.

In particular, incident handling module 908 directs processing system 903 to identify a first course of action for responding to an incident type in an information technology environment. Simulation performance module 909 directs processing system 903 to generate a simulated incident associated with the incident type and initiate performance of the first course of action based on the generation of the simulated incident. Upon reaching a particular step of the first course of action that prevents the performance of the first course of action from proceeding, simulation performance module 909 directs processing system 903 to provide a first simulated result that allows the performance of the first course of action to proceed.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A computer-implemented method performed by an advisement system coupled to an information technology (IT) environment, the method comprising:
   identifying first incident data indicating an occurrence of an incident affecting a computing asset in the IT environment, wherein the incident is associated with an incident type;
   identifying, based on the first incident data, a course of action used to respond to incidents associated with the incident type;
   generating second incident data representing a simulated incident, wherein generating the second incident data includes:
      identifying the incident type associated with the incident,
      generating incident characteristics associated with the incident type, wherein at least one of the incident characteristics is generated based on a characteristic of a computing asset in the IT environment involved in the incident, and
      storing the incident characteristics as part of the second incident data;
   executing the course of action using the second incident data as input;
   identifying, during execution of the course of action, a step of the course of action that prevents execution of the course of action from proceeding to a next step;
   generating a simulated result for the step of the course of action, wherein generating the simulated result includes generating a value based on a type of input used by the next step; and
   using the simulated result for the step to allow execution of the course of action to proceed to the next step.

2. The method of claim 1, further comprising:
   identifying a plurality of paths that the course of action can optionally follow subsequent to the step preventing execution of the course of action from proceeding;
   selecting a first path of the plurality of paths; and
   generating the simulated result to cause the execution of the course of action to proceed down the first path.

3. The method of claim 1, further comprising:
   identifying a plurality of paths that the course of action can optionally follow subsequent to the step preventing execution of the course of action from proceeding;
   selecting a first path of the plurality of paths;
   generating the simulated result to cause the execution of the course of action to proceed down the first path;
   selecting a second path of the plurality of paths; and
   generating a second simulated result to cause the execution of the course of action to proceed down the second path.

4. The method of claim 1, wherein the step is a first step, wherein the next step is a first next step, wherein the type of input is a first type of input, and wherein the method further comprises:
   identifying, during execution of the course of action, a second step of the course of action that prevents execution of the course of action from proceeding to a second next step;
   generating a second simulated result for the second step of the course of action, wherein generating the second simulated result includes generating a value based on a second type of input used by the second next step; and
   using the second simulated result for the second step to allow execution of the course of action to proceed to the second next step.

5. The method of claim 1, wherein identifying the step of the course of action that prevents execution of the course of action from proceeding to the next step includes determining that the step involves a service that is currently unavailable.

6. The method of claim 1, wherein the second incident data representing the simulated incident includes user-defined characteristics.

7. The method of claim 1, further comprising:
causing display of the course of action using a visual programming language.

8. The method of claim 1, further comprising:
causing display of a progress indication for execution of the course of action in association with a visual programming language representation of the course of action.

9. The method of claim 1, further comprising:
upon reaching the step, causing display of an indication that performance of the course of action cannot proceed from the step, wherein the indication is displayed nearby the step as represented by a visual programming language.

10. The method of claim 1, further comprising:
causing display of a request element for the simulated result, wherein the request element is displayed nearby the step as represented by a visual programming language.

11. The method of claim 1, wherein the incident characteristics include at least one of: network addresses involved in the incident, access privileges used in the incident, protocols used in the incident, or types of computing assets involved in the incident.

12. The method of claim 1, wherein the second incident data is generated by copying incident data from a previously identified incident.

13. The method of claim 1, further comprising determining that the next step accepts a value within a range of values, and wherein generating the simulated result for the step of the course of action includes generating a value within a range of values.

14. The method of claim 1, further comprising:
identifying a plurality of paths that the course of action can optionally follow subsequent to the step preventing execution of the course of action from proceeding; and
executing two or more paths of the plurality of paths in parallel.

15. The method of claim 1, further comprising:
receiving input requesting to modify a step of the course of action; and
modifying the step of the course of action.

16. One or more non-transitory computer readable storage media having program instructions stored thereon, the program instructions, when read and executed by a processing system, direct the processing system to:
identify first incident data indicating an occurrence of an incident affecting a computing asset in an IT environment, wherein the incident is associated with an incident type;
identify, based on the first incident data, a course of action used to respond to incidents associated with the incident type;
generate second incident data representing a simulated incident, wherein generating the second incident data includes:
identifying the incident type associated with the incident,
generating incident characteristics associated with the incident type, wherein at least one of the incident characteristics is generated based on a characteristic of a computing asset in the IT environment involved in the incident, and
storing the incident characteristics as part of the second incident data;
execute the course of action using the second incident data as input;
identify, during execution of the course of action, a step of the course of action that prevents execution of the course of action from proceeding to a next step;
generate a simulated result for the step of the course of action, wherein generating the simulated result includes generated a value based on a type of input used by the next step; and
use the simulated result for the step to allow execution of the course of action to proceed to the next step.

17. The one or more computer readable storage media of claim 16, wherein the program instructions further direct the processing system to:
identify a plurality of paths that the course of action can optionally follow subsequent to the step preventing execution of the course of action from proceeding;
select a first path of the plurality of paths; and
generate the simulated result to cause the execution of the course of action to proceed down the first path.

18. The one or more computer readable storage media of claim 16, wherein the program instructions further direct the processing system to:
identify a plurality of paths that the course of action can optionally follow subsequent to the step preventing execution of the course of action from proceeding;
select a first path of the plurality of paths;
generate the simulated result to cause the execution of the course of action to proceed down the first path;
select a second path of the plurality of paths; and
generate a second simulated result to cause the execution of the course of action to proceed down the second path.

19. The one or more computer readable storage media of claim 16, wherein the step is a first step, wherein the type of input is a first type of input, and wherein the program instructions further direct the processing system to:
identify, during execution of the course of action, a second step of the course of action that prevents execution of the course of action from proceeding to a second next step;
generate a second simulated result for the second step of the course of action, wherein generating the second simulated result includes generated a value based on a second type of input used by the second next step; and
use the second simulated result for the second step to allow execution of the course of action to proceed to the second next step.

20. The one or more computer readable storage media of claim 16, wherein identifying the step of the course of action that prevents execution of the course of action from proceeding to the next step includes determining that the step involves a service that is currently unavailable.

21. The one or more computer readable storage media of claim 16, wherein the program instructions further direct the processing system to:
cause display of the course of action using a visual programming language.

22. The one or more computer readable storage media of claim 16, wherein the program instructions further direct the processing system to:

cause display of a progress indication for execution of the course of action in association with a visual programming language representation of the course of action.

23. The one or more computer readable storage media of claim 16, wherein the program instructions further direct the processing system to:
upon reaching the step, cause display of an indication that performance of the course of action cannot proceed from the step, wherein the indication is displayed nearby the step as represented by a visual programming language.

24. The one or more computer readable storage media of claim 16, wherein the program instructions further direct the processing system to:
cause display of a request element for the simulated result, wherein the request element is displayed nearby the step as represented by a visual programming language.

25. An apparatus for improving information technology (IT) incident response, the apparatus comprising:
one or more non-transitory computer readable storage media;
a processing system operatively coupled with the one or more non-transitory computer readable storage media; and
program instructions stored on the one or more non-transitory computer readable storage media that, when read and executed by the processing system, direct the processing system to:
identify first incident data indicating an occurrence of an incident affecting a computing asset in an IT environment, wherein the incident is associated with an incident type;
identify, based on the first incident data, a course of action used to respond to incidents associated with the incident type;
generate second incident data representing a simulated incident, wherein generating the second incident data includes:
identifying the incident type associated with the incident,
generating incident characteristics associated with the incident type, wherein at least one of the incident characteristics is generated based on a characteristic of a computing asset in the IT environment involved in the incident, and
storing the incident characteristics as part of the second incident data;
execute the course of action using the second incident data as input;
identify, during execution of the course of action, a step of the course of action that prevents execution of the course of action from proceeding to a next step;
generate a simulated result for the step of the course of action, wherein generating the simulated result includes generating a value based on a type of input used by the next step; and
use the simulated result for the step to allow execution of the course of action to proceed to the next step.

26. The apparatus of claim 25, wherein the incident characteristics include at least one of: network addresses involved in the incident, access privileges used in the incident, protocols used in the incident, or types of computing assets involved in the incident.

27. The apparatus of claim 25, wherein the second incident data is generated by copying incident data from a previously identified incident.

28. The apparatus of claim 25, further comprising determining that the next step accepts a value within a range of values, and wherein generating the simulated result for the step of the course of action includes generating a value within a range of values.

* * * * *